United States Patent [19]
Evans et al.

[11] Patent Number: 5,891,949
[45] Date of Patent: *Apr. 6, 1999

[54] NATURAL RUBBER COMPOUND

[75] Inventors: Larry R. Evans, Colora; William C. Fultz, Rising Sun, both of Md.

[73] Assignee: J.M. Huber Corporation, Edison, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 850,811

[22] Filed: May 2, 1997

[51] Int. Cl.⁶ ....................................................... C08K 3/00
[52] U.S. Cl. .......................................... 524/493; 524/492
[58] Field of Search ...................................... 524/492, 493

[56] References Cited

U.S. PATENT DOCUMENTS

| | | | |
|---|---|---|---|
| 3,977,893 | 8/1976 | Wason | 106/288 B |
| 4,127,641 | 11/1978 | Aldcroft et al. | 423/339 |
| 4,179,431 | 12/1979 | Kilian et al. | 260/42.37 |
| 4,251,281 | 2/1981 | Macurat et al. | 106/288 B |
| 4,279,766 | 7/1981 | Joubert et al. | 252/174.25 |
| 4,422,880 | 12/1983 | Wason et al. | 106/288 B |
| 4,590,052 | 5/1986 | Chevallier et al. | 423/335 |
| 4,708,859 | 11/1987 | Chevallier | 423/339 |
| 4,842,838 | 6/1989 | Chevallier | 423/339 |
| 4,874,594 | 10/1989 | Chevallier | 423/335 |
| 5,089,554 | 2/1992 | Bomo et al. | 524/493 |
| 5,124,143 | 6/1992 | Muhlemann et al. | 424/49 |
| 5,227,425 | 7/1993 | Rauline | 524/493 |
| 5,342,598 | 8/1994 | Persello | 423/339 |
| 5,395,605 | 3/1995 | Billion et al. | 423/339 |
| 5,403,570 | 4/1995 | Chevallier et al. | 423/339 |
| 5,547,502 | 8/1996 | Chevallier et al. | 106/287 |
| 5,587,416 | 12/1996 | Chevallier et al. | 524/492 |
| 5,605,569 | 2/1997 | Boyer et al. | 106/482 |
| 5,605,950 | 2/1997 | Evans et al. | 524/492 |
| 5,610,221 | 3/1997 | Waddell et al. | 524/492 |
| 5,635,214 | 6/1997 | Ponchon et al. | 424/489 |
| 5,637,636 | 6/1997 | Cartwright et al. | 524/493 |

FOREIGN PATENT DOCUMENTS

| | | |
|---|---|---|
| 602604 | 8/1960 | Canada . |
| 0 407 262 A | 1/1991 | European Pat. Off. . |
| 0 647 591 B | 4/1995 | European Pat. Off. . |
| 0 708 137 A | 4/1996 | European Pat. Off. . |
| 710015 | 6/1954 | United Kingdom . |
| 719918 | 12/1954 | United Kingdom . |
| WO 95/09127 | 4/1995 | WIPO . |
| WO 95/09128 | 4/1995 | WIPO . |

*Primary Examiner*—Edward J. Cain
*Attorney, Agent, or Firm*—Robert A. Koons, Jr.; Russell G. Lindenfeldar; Pepper Hamilton LLP

[57] ABSTRACT

The invention is a natural rubber compound containing a precipitated amorphous silica filter. The silica has a CTAB specific surface area of about 10 m²/g to less than 140 m²/g; a multi-point BET surface area of about 50–225 m²/g; a 5% pH value of about 5.0–8.5; a DBP oil absorption of about 160–310 cm³/100 g; a projected surface area of no greater than about 4000 nm²; and a pore volume ratio of pores ranging from 175 to 275 Å in diameter to all pores less than 400 Å in diameter of about 10% to less than 50%.

16 Claims, 5 Drawing Sheets

DIN Abrasion Index Vs. Percent Silica
(60 phr total Filler, 8% Silane Coupling Agent)

NATURAL RUBBER COMPOUND

FIELD OF THE INVENTION

The invention relates to a natural rubber compound. More particularly, the invention relates to a natural rubber compound containing an improved silica filler, said compound being useful as a truck tire tread formulation.

DESCRIPTION OF THE RELATED ART

Natural rubber compounds have been and continue to be commonly used in the production of truck tire treads. In addition to natural rubber (cis-1,4-polyisoprene), natural rubber compounds may also contain synthetic cis-polyisopropene, styrene-butadiene rubber, polybutadiene rubber and other polymeric compositions. In addition, natural rubber compounds have conventionally contained carbon black fillers to improve processability and tread performance characteristics, including strength, durability and traction.

In order to provide performance lacking in compounds using carbon black fillers, substitute fillers which can provide comparable processability with tread performance enhancements have long been sought. In particular, precipitated amorphous silica products have been investigated as a replacement for carbon black in natural rubber truck tire tread compounds. In general, silica filler has been found to provide improved rolling resistance and tear properties over carbon black fillers in natural rubber truck tire tread compounds, but tread wear and other performance characteristics are compromised unless significant amounts of expensive coupling agents are used in conjunction with the silica products. Prior art compounds have required anywhere from 8% to as much as 12% or more coupling agent relative to silica weight content in order to approach the tread wear achieved with carbon black fillers.

OBJECTS OF THE INVENTION

It is accordingly an object of the invention to provide a natural rubber compound containing precipitated amorphous silica filler that, when furnished into a truck tire tread, exhibits tread wear characteristics comparable to natural rubber compounds containing carbon black without the large quantities of coupling agent required in prior art compounds.

Other objects will become apparent from the description of the invention which follows.

SUMMARY OF THE INVENTION

Briefly, the invention is a natural rubber compound containing a precipitated amorphous silica filler having a CTAB specific surface area of about 10 $m^2/g$ to less than 140 $m^2/g$, preferably about 10–110 $m^2/g$, more preferably about 10 $m^2/g$ to less than 100 $m^2/g$; a multi-point BET surface area of about 50–225 $m^2/g$; a 5% pH value of about 5.0–8.5; a DBP oil absorption of about 160–310 $cm^3/100$ g; a projected surface area of no greater than about 4000 $nm^2$, preferably no greater than about 3500 $nm^2$, and a pore volume ratio of pores ranging from 175 to 275 Å in diameter to all pores less than 400 Å in diameter of about 10% to less than 50%. The silica filler is preferably formed, and the formed silica filler preferably has a bulk density of about 0.16–0.30 g/mL, more preferably about 0.16–0.27 g/mL. The silica filler is preferably present at about 40–80 phr, more preferably at about 50–70 phr. The invention also preferably contains a coupling agent, preferably at about 2–10% of the silica filler weight content, more preferably at about 4–6% of the silica filler weight content.

The invention may contain one or more other fillers in addition to the silica filler. Preferably, the invention contains carbon black filler in addition to the silica filler, with each filler preferably being present at about 20–40 phr.

DETAILED DESCRIPTION OF THE INVENTION

We have discovered a natural rubber compound that surprisingly provides better overall performance in truck tire tread applications than known natural rubber compounds. The invention is also less costly than known natural rubber compounds which contain conventional silica fillers due to its advantageously lower coupling agent demand.

The invention contains a novel precipitated amorphous silica filler which unexpectedly provides truck tire treads furnished from the invention with improved Mooney viscosity, 300% Modulus, Tan Delta and DIN abrasion values versus prior art silica-filled natural rubber compounds. Remarkably, the improvements are seen at even at reduced coupling agent levels, which translates into cost savings over conventional silica-filled natural rubber compounds because the invention provides better truck tire tread performance with less coupling agent. Further, the performance of truck tire treads formed from the invention is comparable to or better than natural rubber compounds containing carbon black filler only.

The precipitated amorphous silica filler used in the invention possesses a unique combination of physical characteristics. Specifically, the silica has a CTAB specific surface area of about 10 $m^2/g$ to less than 140 $m^2/g$, preferably about 10–110 $m^2/g$, more preferably about 10 $m^2/g$ to less than 100 $m^2/g$; a multi-point BET surface area of about 50–225 $m^2/g$; a 5% pH value of about 5.0–8.5; a DBP oil absorption of about 160–310 $cm^3/100$ g; a projected surface area of no greater than about 4000 $nm^2$, preferably no greater than about 3500 $nm^2$; and a pore volume ratio of pores 175 to 275 Å in diameter to all pores less than 400 Å in diameter of about 10% to less than 50%. It is believed that the silica filler's specific combination of physical characteristics is responsible for the advantageously low coupling agent demand and improved truck tire tread characteristics provided by the invention.

The silica filler used in the invention may be formed to facilitate handling and incorporation into the natural rubber. The formed silica filler preferably has a bulk density of about 0.16–0.30 g/mL, more preferably about 0.16–0.27 g/mL. Granulation, pelletization, and/or other known forming means can be used. A granulation process is preferred where the silica product is compressed into compacted bodies, the bodies then being broken into smaller particles. The fine fraction of the smaller particles is recovered and mixed with more silica product, and that mixture is compressed into denser compacted bodies. The denser compacted bodies are then broken-up and screened to the desired size distribution to form the granulated product. A vacuum may be applied during various points in the process to aid in densification.

The silica filler may be present in the invention at any desired loading level, and may be used alone or in combination with one or more other fillers, including carbon blacks and/or other silica products. When used as the sole filler component, the silica filler is preferably contained in the natural rubber compound at about 40–80 phr, more preferably at about 50–70 phr. When used in combination with carbon black, both the carbon black and silica are preferably present in the natural rubber compound at about 20–40 phr.

The invention preferably contains a coupling agent. The coupling agent is preferably present at about 2–10%, more preferably at about 4–6% of the weight content of silica filler. The type of coupling agent employed is not particularly limited, and can be of any type known in the art.

In addition to natural rubber (cis-1,4-polyisoprene), the natural rubber compound may contain one or more other polymeric compositions, including synthetic cis-polyisoprene, styrene-butadiene rubber and polybutadiene rubber.

The invention will now be described through illustrative examples. The examples are not intended to limit the scope of invention defined in the appended claims.

EXAMPLE 1

Prepared were three natural rubber compounds containing one of three silica products as a filler, each compound having 60 phr total filler and 8% silane coupling agent in terms of silica weight content. The distinguishing silica fillers used in the compounds were Hubersil® 1635 (Prior Art Silica Product 1, J. M. Huber Corporation), Zeopol® 8745 (Prior Art Silica Product Example 2, J. M. Huber Corporation), a silica powder in accordance with the invention (Silica Product 1), and a granulated silica product in accordance with the invention (Silica Product 2).

Silica Product 1 was prepared by combining 260 L of water and 200 L of 24.7% sodium silicate (3.3 silicate mole ratio; 82.9% excess silicate, excess silicate=100×volume of silicate initially present in reaction medium total volume of silicate used in the reaction) in a reactor and heating the reaction medium to 82° C. To the heated reaction medium was added 9.5 kg of anhydrous sodium sulfate. Thereafter, sulfuric acid (7.4%) at 33° C. was introduced to the heated reaction medium at 4.5 L/min. When the reaction medium pH reached 7.5, the acid addition rate was slowed to 1.81 L/min, and an addition of 24.7% sodium silicate (3.3 mole ratio) at 1.38 L/min commenced. During the simultaneous addition, the precipitation pH was maintained at 7.5 by adjusting the acid addition rate. The silicate addition was terminated after 30 minutes, but the acid addition continued thereafter at 1.81 L/min until a reaction mixture pH of 5.1 was achieved. The reaction mixture was then allowed to digest at 82° C. for 10 minutes, after which the pH was readjusted to 5.1 with more acid.

Precipitated silica slurry was rotary-filtered from the reaction mixture and washed with water until the sodium sulfate content was reduced. Thereafter, the silica slurry was spray dried.

The physical characteristics of Silica Product 1 were evaluated in accordance with the following procedures, and the results are reported in Table 1.

Multipoint BET

A Gemini III 2375 Surface Area Analyzer (Micromeritics Corporation) was used to determine the surface area of solid materials. During operation, an analysis gas (nitrogen) is metered simultaneously into a tube containing the sample and into a (blank) balance tube. The internal volume and the temperature surrounding both tubes are maintained at identical conditions, with the only difference being the presence of sample in the sample tube.

The sample and balance tubes are immersed in a single liquid nitrogen bath which maintains isothermal conditions for both tubes. Metering of the analysis gas is delivered to both the balance and sample tubes through separate servo valves. A differential pressure transducer measures the pressure imbalance between both tubes, which is caused by the adsorption of the gas onto the sample. As the sample adsorbs analysis gas, the servo valve maintains the pressure balance between the two tubes by admitting more gas into the sample tube. The end result is that the Gemini maintains a constant pressure of the analysis gas over the sample while varying the rate of analysis gas delivery to match the rate at which the sample can adsorb the gas.

Pore Volume Method

Pore volume (mercury pore volume) is determined using an Autopore II 9220 Porosimeter (Micromeritics Corporation). This instrument measures the void volume and pore size distribution of various materials. Mercury is forced into the voids as a function of pressure and the volume of the mercury intruded per gram of sample is calculated at each pressure setting. Total pore volume expressed herein represent the cumulative volume of mercury intruded at pressures from vacuum to 60,000 psi. Increments in volume (cm$^3$/g) at each pressure setting are plotted against the pore radius corresponding to the pressure setting increments. The peak in the intruded volume versus pore radius curve corresponds to the mode in the pore size distribution and identifies the most common pore size in the sample.

Oil Absorption

Oil absorption, using DBP (dibutylphthalate) oil, was determined by the rub-out method. The method involves mixing linseed oil with a silica product by rubbing with a spatula on a smooth surface until a stiff putty-like paste is formed. By measuring the quantity of oil required to saturate the silica product, i.e. the quantity of oil required to form a silica/oil paste mixture which curls when spread out, the oil absorption of the silica product is determined. The oil absorption value is calculated as follows:

$$\text{Oil absorption} = (\text{cm}^3 \text{ oil absorbed} \times 100) \div \text{weight of silica product, grams}$$

$$= \text{cm}^3 \text{ oil}/100 \text{ grams silica product}$$

CTAB Surface Area

The external surface area of silica product was determined by adsorption of CTAB (cetyltrimethylammonium bromide) on the silica product surface, the excess CTAB being separated by centrifugation and determined by titration with sodium lauryl sulfate using a surfactant electrode. The external surface area of the silica product is calculated from the quantity of CTAB adsorbed (analysis of CTAB before and after adsorption).

Specifically, about 0.5 g of silica product is placed in a 250-mL beaker with 100.00 mL CTAB solution (5.5 g/L).

The solution is mixed on an electric stir plate for 1 hour then centrifuged for 30 minutes at 10,000 rpm. 1 mL, of 10% Triton X-100 is added to 5 mL of the clear supernatant in a 100-mL beaker. The pH is adjusted to 3.0–3.5 with 0.1N HCl and titrate with 0.0100M sodium lauryl sulfate using a surfactant electrode (Brinkmann SUR15O1-DL) to determine the endpoint.

Projected Surface Area

The average projected area of the silica product is determined by the following method. 150 mg of silica product are introduced into a beaker containing a mixture of 10 mL of water and 20 mL of isopropyl alcohol; the mixture is agitated with ultrasonics (L&R-PC5 Ultrasonic Cleaning Systems) for 60 minutes, while maintaining temperature below 30° C. After which, while continuing the ultrasonic agitation, 10 microliters of the contents of the beaker are removed by a micropipet and placed on three 200-mesh copper grids which had been carbon Formvar coated. Excess liquid is removed by wicking (touching a sharp corner of filter paper to the drop) after allowing the drop to stand for 20 seconds, so as to prevent reagglomeration of the particles. The average projected area of 1000 aggregates is determined by image analysis.

For image analysis, the TEM micrographs were placed on the epidiascope attachment of the image analyzing computer. Using the area function, the area of all measurable particles in the micrographs was measured. Only particles whose entire feature lay in the micrographs and whose boundaries were clearly defined were analyzed. In this case, a particle was defined as an aggregate of silica particles. Various size ranges were selected according to the available ranges of the image analyzer. The data were obtained as the number of particles within each size range.

5% pH

A 5% pH is determined by weighing 5.0 grams of silica product into a 250-mL, beaker, adding 95 mL deionized or distilled water, mixing for 7 minutes on a magnetic stir plate, and measuring the pH with a pH meter which has been standardized with two buffer solutions bracketing the expected pH range.

Percent Sodium Sulfate

A 13.3 gram sample of silica product is weighed out and added to 240 mL of distilled water. The slurry is mixed for 5 minutes on a Hamilton Beach mixer. The slurry is transferred to a 250 mL graduate and distilled water is added to make 250 mL of slurry. Sample is mixed and the temperature of the slurry is determined. The conductivity of the solution is measured using a Solu-Bridge with the temperature compensator properly adjusted. The percent sodium sulfate is determined from a standard calibrated chart.

Percent Free Moisture

A sample of about 2.0 grams is weighed in a pre-weighed weighing dish to the nearest 0.0001 gram. The sample is placed in an oven for 2 hours at 105° C., then removed and cooled in a desiccator. The cooled sample is weighed and the weight loss is divided by the original weight of sample and multiplied by 100, resulting in the percent moisture.

In addition to Silica Product 1 (a silica powder), Silica Product 2 (a granulated silica product) was prepared by combining 235 L of water and 166 L of 30.0% sodium silicate (2.5 mole ratio, 84.7% excess silicate) in a reactor and heating the reaction medium to 87° C. Sulfuric acid (11.4%) at 33° C. was introduced to the heated reaction medium at 2.7 L/min. When the reaction medium pH reached 7.5, the acid addition rate was slowed to 1.4 L/min, and an addition of 30.0% sodium silicate (2.5 mole ratio) at 1.0 L/min commenced. During the simultaneous addition, the precipitation pH was maintained at 7.5 by adjusting the acid addition rate. The silicate addition was terminated after 30 minutes, but the acid addition continued thereafter at 1.3 L/min until a reaction mixture pH of 5.5 was achieved. The reaction mixture was then allowed to digest at 87° C. for 10 minutes, after which the pH was readjusted to 5.5 with more acid.

Precipitated silica slurry was rotary-filtered from the reaction mixture and washed with water until the sodium sulfate content was reduced. The pH of the washed silica slurry was adjusted to 6.5 with more acid, and thereafter the silica slurry was spray dried. Granulation was then accomplished by compacting the silica product between pocketed tandem rolls at 700 psi, attriting the compacted silica product into smaller particles, recycling the fine fraction (less than 16 mesh) of the smaller particles into the tandem rolls with more silica product to produce a denser compacted silica product, then attriting and screening the denser compacted silica product to produce a granulated silica product. Prior to and during compaction, vacuum was applied to the granulation system to deaerate the silica feed.

Silica Product 2 had bulk density of 0.281 g/mL and a size distribution of 83.3% +50 mesh and 5.4%−200 mesh. The bulk density was determined by fixing a funnel having a closable opening 3 inches above the mouth of a standard pint cup. The granulated silica product was loaded into the closed funnel, then the funnel was opened to allow the granules to free fall into and overflow the cup. The granules were then scraped off level with the top of the cup using the flat edge of a spatula. The full cup was weighed and the weight of the granules (in grams to the nearest 0.1 gram) was determined by subtracting the weight of the empty cup. The weight of the granules was divided by the standard volume (in mL) of the cup to give the bulk density in g/mL.

The size distribution of the granulated silica product was determined by weighing fractions retained on or passing through 8 inch diameter stainless steel U.S. Sieves number 50 and 200 mesh, opening sizes 297 $\mu$m and 74 $\mu$m, respectively. Specifically, a 10.0±0.1 g sample of the granulated product was placed on top of a stacked set of screens. The screens were covered and shaken for 5 minutes on a Portable Sieve Shaker, C-E Tyler Model RX-24, (W. S. Tyler Inc.). The percentage of the sample passing or retained on the mesh sizes described above was determined by weight.

Other physical characteristics of Silica Product 2 were evaluated using the procedures described above, and the results are reported in Table 1.

TABLE 1

| Physical Characteristics | Prior Art Silica Product 1 | Prior Art Silica Product 2 | Silica Product 1 | Silica Product 2 |
|---|---|---|---|---|
| Form | Granule | Granule | Powder | Granule |
| Specific Surface Area by CTAB, m$^2$/g | 126 | 143 | 92 | 81 |
| Specific Surface Area by BET, m$^2$/g | 147 | 183 | 150 | 132 |
| pH, 5% Aqueous slurry | 7.1 | 7.2 | 6.7 | 7.2 |
| Mercury Intrusion Peak location, Å | 480 | 285 | 790 | 640 |
| Mercury Intrusion Total Pore Volume, cm$^3$/g | 2.89 | 4.99 | 5.57 | 1.86 |
| % Na$_2$SO$_4$ | 1.0 | 1.8 | 1.4 | 1.6 |
| Projected Surface Area, nm$^2$ | 12,211 | 1967 | 3098 | *** |
| % Free Moisture | 5.2 | 5.0 | 5.9 | 6.0 |
| DBP Oil Absorption, cm$^3$/100 g | 201 | 298 | 242 | 173 |
| Mercury Intrusion Pore Volume Ratio, (V2/V1)*100 | *** | 40 | 29 | 24 |

Natural rubber compounds containing natural rubber and either Prior Art Silica Product 1, Prior Art Silica Product 2 or Silica Product 1 as a filler were prepared. Three versions of each natural rubber compound were made: one containing 52.5 phr silica filler and 10.5 phr X50S silane coupling agent (10% silane in terms of the silica filler weight), another containing 52.5 phr silica and 6.3 phr X50S silane coupling agent (6% silane in terms of the silica filler weight), and a third containing 30 phr silica filler, 30 phr N110 carbon black filler, and 4.8 phr X50S silane coupling agent (8% silane in terms of the silica filler weight). Also prepared for comparative purposes was a natural rubber compound containing natural rubber and 50 phr N110 carbon black (no silane coupling agent).

The resulting natural rubber compounds were evaluated for Mooney Viscosity (ASTM D1646), ts2, T50 and T90 (all ASTM D2084), 300% Modulus, Tensile at Break and Elongation at Break (all ASTM D412), Zwick Rebound at 100° C. and −27° C. (ASTM 1504), Molded Groove Tear Strength (ASTM D624) and DIN Abrasion Index (ISO-4649 Method B). In addition, Tangent Delta at 60° C. and 1% strain was evaluated for each compound using an RPA 2000 by Monsanto. The results of the evaluations are summarized in Tables 2–4.

TABLE 2

| Filler | Prior Art Silica Product 2 | Silica Product 1 | Prior Art Silica Product 1 | N110 Carbon Black |
| --- | --- | --- | --- | --- |
| Filler Loading, phr | 52.5 | 52.5 | 52.5 | 50 |
| Coupling Agent Content, phr | 10.5 | 10.5 | 10.5 | 0 |
| Wt of Coupling Agent/Wt of Silica Filler, % | 10 | 10 | 10 | 0 |
| Mooney Viscosity | 69.5 | 61 | 73.5 | 56 |
| TS2 Scorch Time, minutes | 5 | 6 | 5.3 | 8 |
| T50 Cure Time, minutes | 9.8 | 9.4 | 10.2 | 9.8 |
| T90 Cure Time, minutes | 15.5 | 14.4 | 16.1 | 11.9 |
| Tangent Delta @ 60° C. | 0.113 | 0.089 | 0.12 | 0.21 |
| 300% Modulus, psi | 1698 | 1765 | 1637 | 1861 |
| Tensile, psi | 3602 | 3656 | 2899 | 3954 |
| Elongation to Break, % | 567 | 553 | 512 | 559 |
| Rebound @ 100° C., % | 68.8 | 70.2 | 68 | 66.2 |
| Rebound @ −27° C., % | 10 | 9.8 | 10.1 | 11.2 |
| Tear, N/m | 22.1 | 24.1 | 17.4 | 18.7 |
| DIN Abrasion, Index | 104 | 114 | 90 | 122 |
| Characterization | Comparative Example | Example of the Invention | Comparative Example | Comparative Example |

TABLE 3

| Filler | Prior Art Silica Product 2 | Silica Product 1 | Prior Art Silica Product 1 | N110 Carbon Black |
| --- | --- | --- | --- | --- |
| Filler Loading, phr | 52.5 | 52.5 | 52.5 | 50 |
| Coupling Agent Loading, phr | 6.3 | 6.3 | 6.3 | 0 |
| Wt of Coupling Agent/Wt of Silica Filler, % | 6 | 6 | 6 | 0 |
| Mooney Viscosity | 81.9 | 66.4 | 89.3 | 56 |
| TS2 Scorch Time, minutes | 4.4 | 6.2 | 5.7 | 8 |
| T50 Cure Time, minutes | 9.6 | 10 | 14.2 | 9.8 |
| T90 Cure Time, minutes | 16.4 | 13.7 | 20.7 | 11.9 |
| Tangent Delta @ 60° C. | 0.111 | 0.095 | 0.124 | 0.121 |
| 300% Modulus, psi | 1601 | 1731 | 1455 | 1861 |
| Tensile, psi | 3269 | 3554 | 2789 | 3954 |
| Elongation to Break, % | 831 | 881 | 732 | 559 |
| Rebound @ 100° C., % | 59.8 | 73 | 62.5 | 66.2 |
| Rebound @ −27° C., % | 10.8 | 9.6 | 10.2 | 11.2 |
| Tear, N/m | 31.5 | 40.9 | 21.3 | 18.7 |
| DIN Abrasion, Index | 91 | 112 | 73 | 122 |
| Characterization | Comparative Example | Example of the Invention | Comparative Example | Comparative Example |

TABLE 4

| Filler | Prior Art Silica Product 2 and N110 Carbon Black | Silica Product 1 and N110 Carbon Black | Prior Art Silica Product 1 and N110 Carbon Black | N110 Carbon Black |
|---|---|---|---|---|
| Filler Loading, phr | 30 silica/30 carbon black | 30 silica/30 carbon black | 30 silica/30 carbon black | 50 |
| Coupling Agent Loading, phr | 4.8 | 4.8 | 4.8 | 0 |
| Wt of Coupling Agent/Wt of Silica Filler, % | 8 | 8 | 8 | 0 |
| Mooney Viscosity | 70.6 | 59.4 | 71.9 | 56 |
| TS2 Scorch Time, minutes | 5.9 | 5.9 | 5.2 | 8 |
| T50 Cure Time, minutes | 6.9 | 8.1 | 8 | 9.8 |
| T90 Cure Time, minutes | 11.6 | 10.3 | 14.1 | 11.9 |
| Tangent Delta @ 60° C. | 0.096 | 0.072 | 0.101 | 0.121 |
| 300% Modulus, psi | 1658 | 1792 | 1489 | 1861 |
| Tensile, psi | 4054 | 3883 | 2995 | 3954 |
| Elongation to Break, % | 871 | 944 | 814 | 559 |
| Rebound @ 100° C., % | 68.2 | 76 | 64 | 66.2 |
| Rebound @ −27° C., % | 10 | 10.2 | 10.5 | 11.2 |
| Tear, N/m | 26.3 | 32.7 | 20.2 | 18.7 |
| DIN Abrasion, Index | 110 | 128 | 86 | 122 |
| Characterization | Comparative Example | Example of the Invention | Comparative Example | Comparative Example |

Tables 2–4 show that the natural rubber compound in accordance with the invention (containing Silica Product 1) exhibits processing and performance characteristics equal to or better than the comparative example natural rubber compounds (containing Prior Art Silica Products 1 or 2). The natural rubber compound in accordance with the invention also compares favorably with the carbon black filled compound in terms of the evaluated processing and performance characteristics.

EXAMPLE 2

To further demonstrate the advantages of the invention, natural rubber compounds containing natural rubber and either Prior Art Silica Product 1, Prior Art Silica Product 2 or Silica Product 2 were produced. Several versions of each compound were made, the versions differing in that the silica content of the fillers were 25%, 50%, 75% or 100%, with the balance of the fillers being N110 carbon black. A compound having a 0% silica/100% carbon black filler and no coupling agent was also prepared.

Mooney Viscosity, 300% Modulus and DIN Abrasion Index were evaluated for each rubber compound in accordance with ASTM D1646, ASTM D412 and ISO-4649 Method B, respectively. In addition, Tangent Delta at 60° C. and 1% strain was evaluated for each compound using an RPA 2000 by Monsanto. The results of the evaluations are graphically summarized in FIGS. 1–4.

Figure 1:
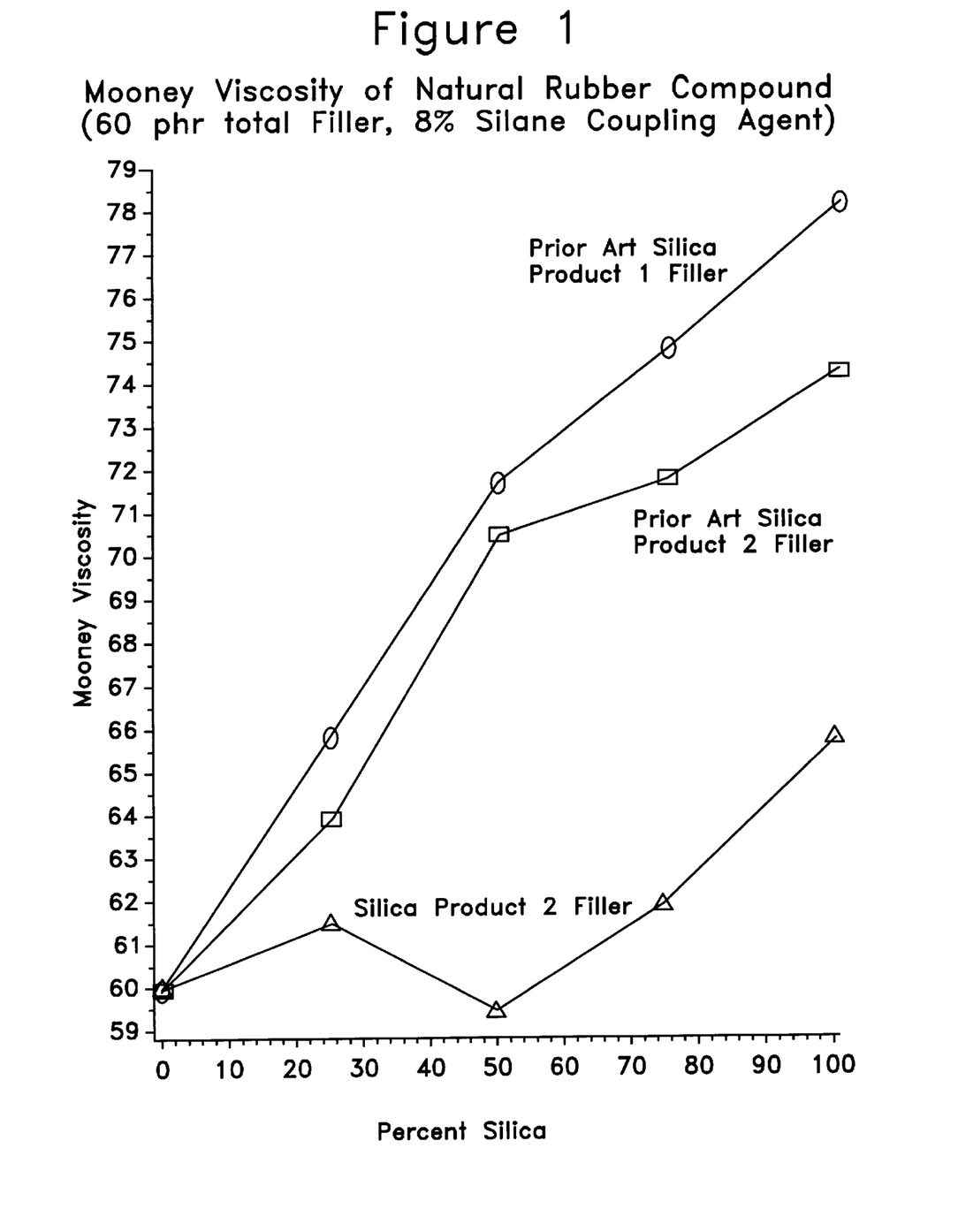
FIG. 1 is a graph of the relationship between Mooney Viscosity and wt % silica for various silica/carbon black fillers in a natural rubber compound.
Figure 2:
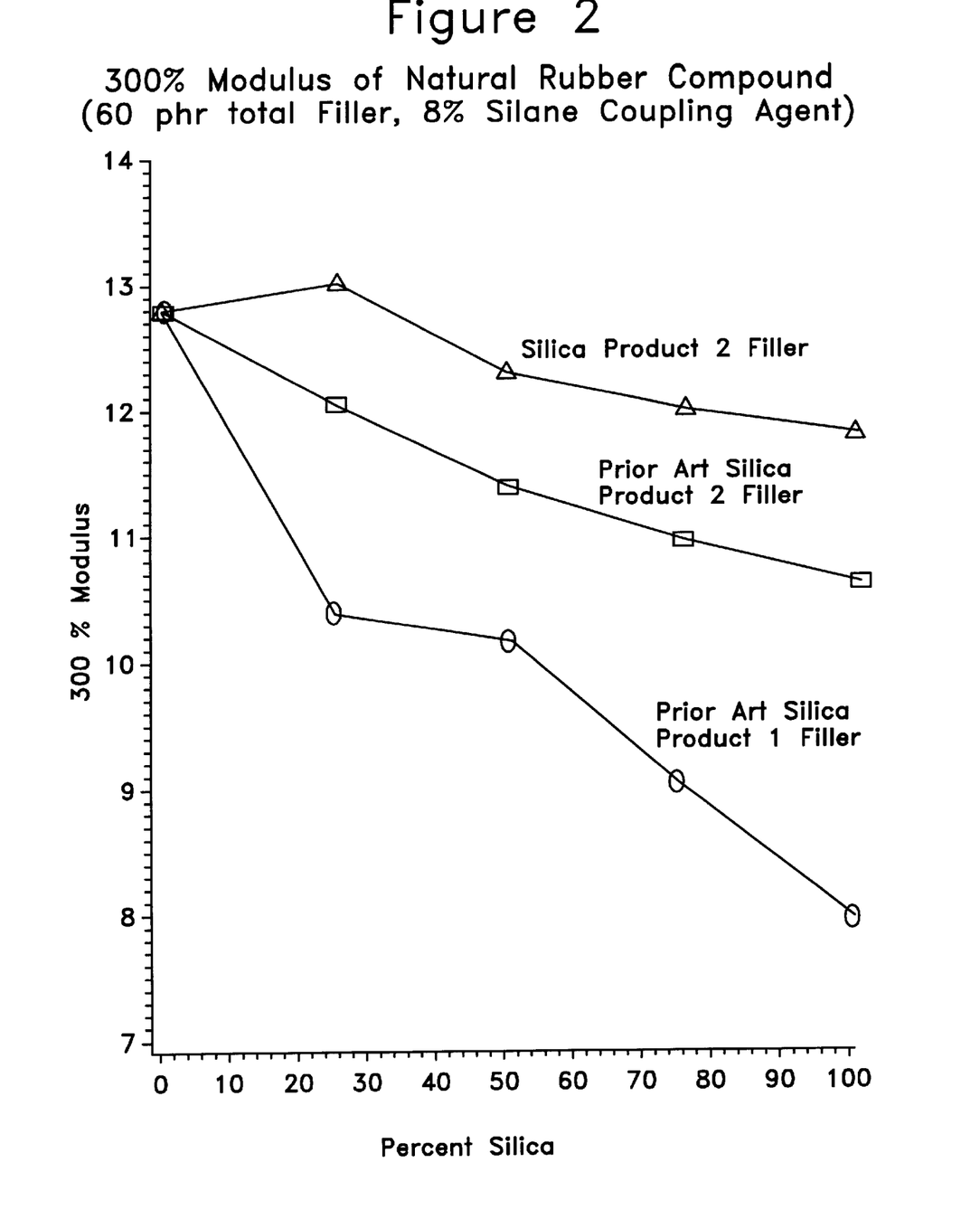
FIG. 2 is a graph of the relationship between 300% Modulus and wt % silica for various silica/carbon black fillers in a natural rubber compound.
Figure 3:
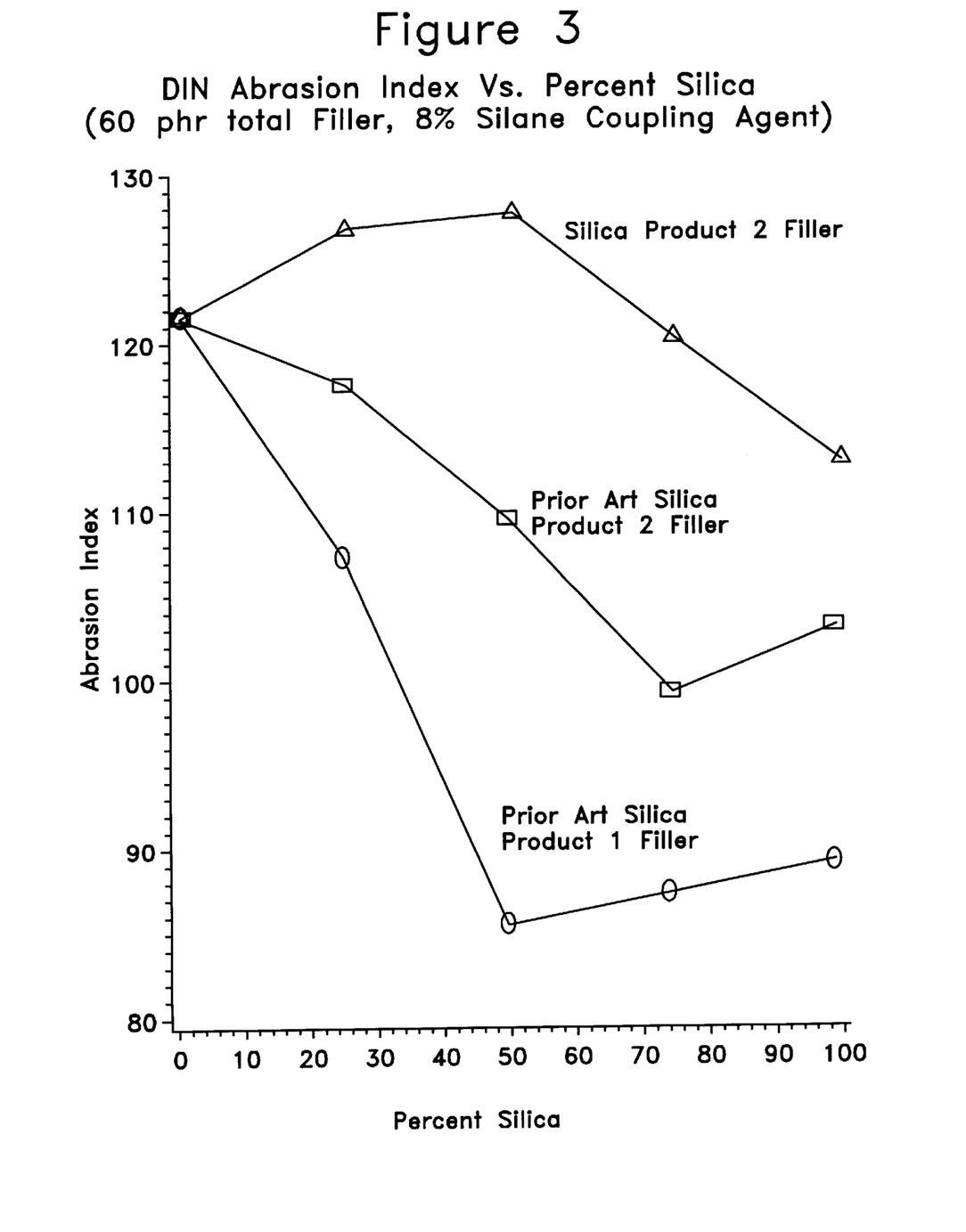
FIG. 3 is a graph of the relationship between DIN Abrasion Index and wt % silica for various silica/carbon black fillers in a natural rubber compound.
Figure 4:
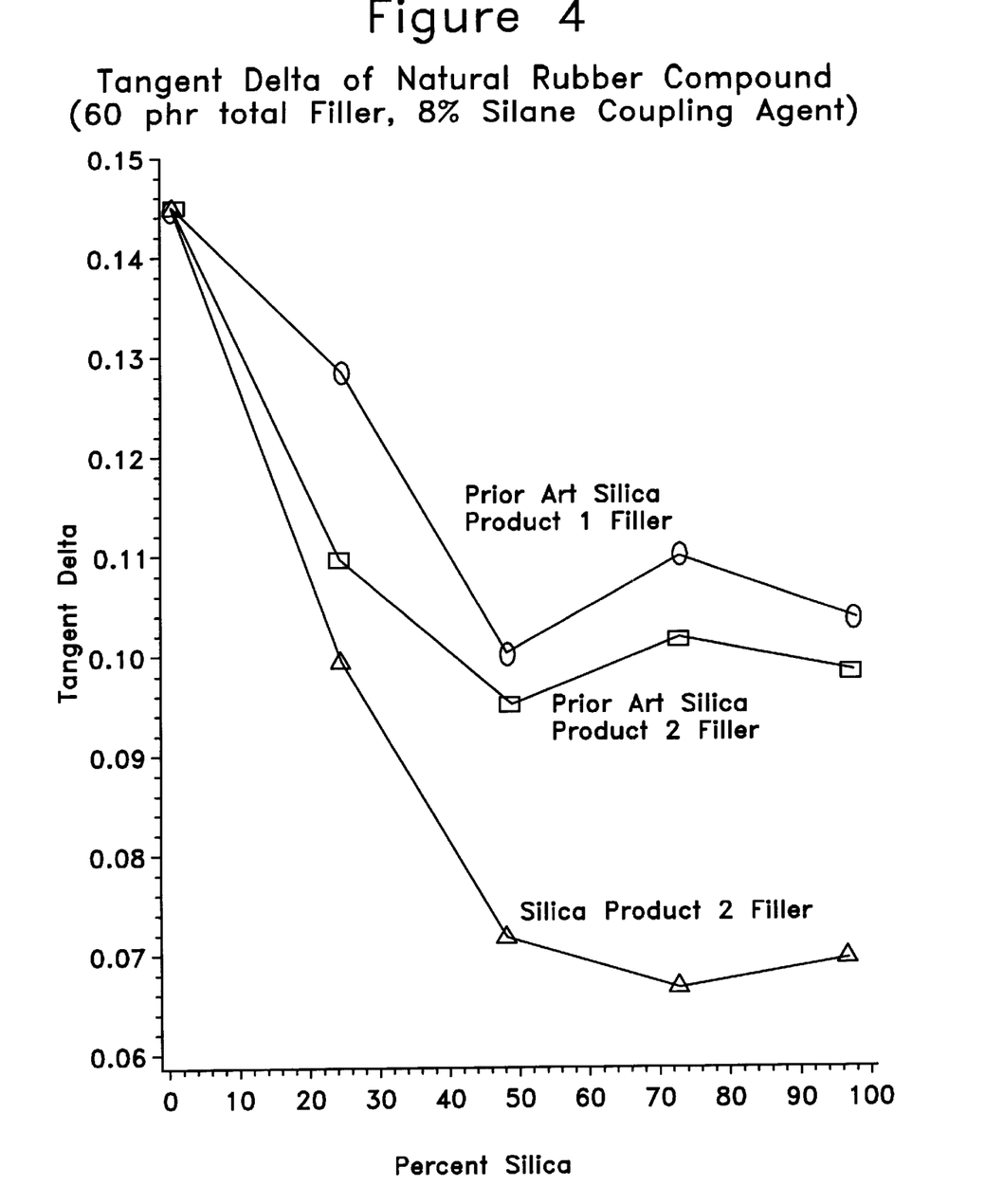
FIG. 4 is a graph of the relationship between Tangent Delta and wt % silica for various silica/carbon black fillers in a natural rubber compound.

As seen in FIG. 1, the natural rubber compound in accordance with the invention (containing Silica Product 2) exhibited lower Mooney Viscosity than the comparative natural rubber compounds at every silica filler content, thus evidencing the mixing and extrusion advantages provided by the invention. FIGS. 2 and 3 reveal that the inventive rubber compound possesses a higher 300% Modulus and DIN Abrasion Index than the comparative compounds at every silica content, thereby reflecting the tread wear advantages offered by the invention. The lowered rolling resistance provided by the invention is indicated in FIG. 4, which shows that the inventive compound exhibits a lower Tangent Delta than the comparative compounds at every silica filler content.

EXAMPLE 3

Figure 5:
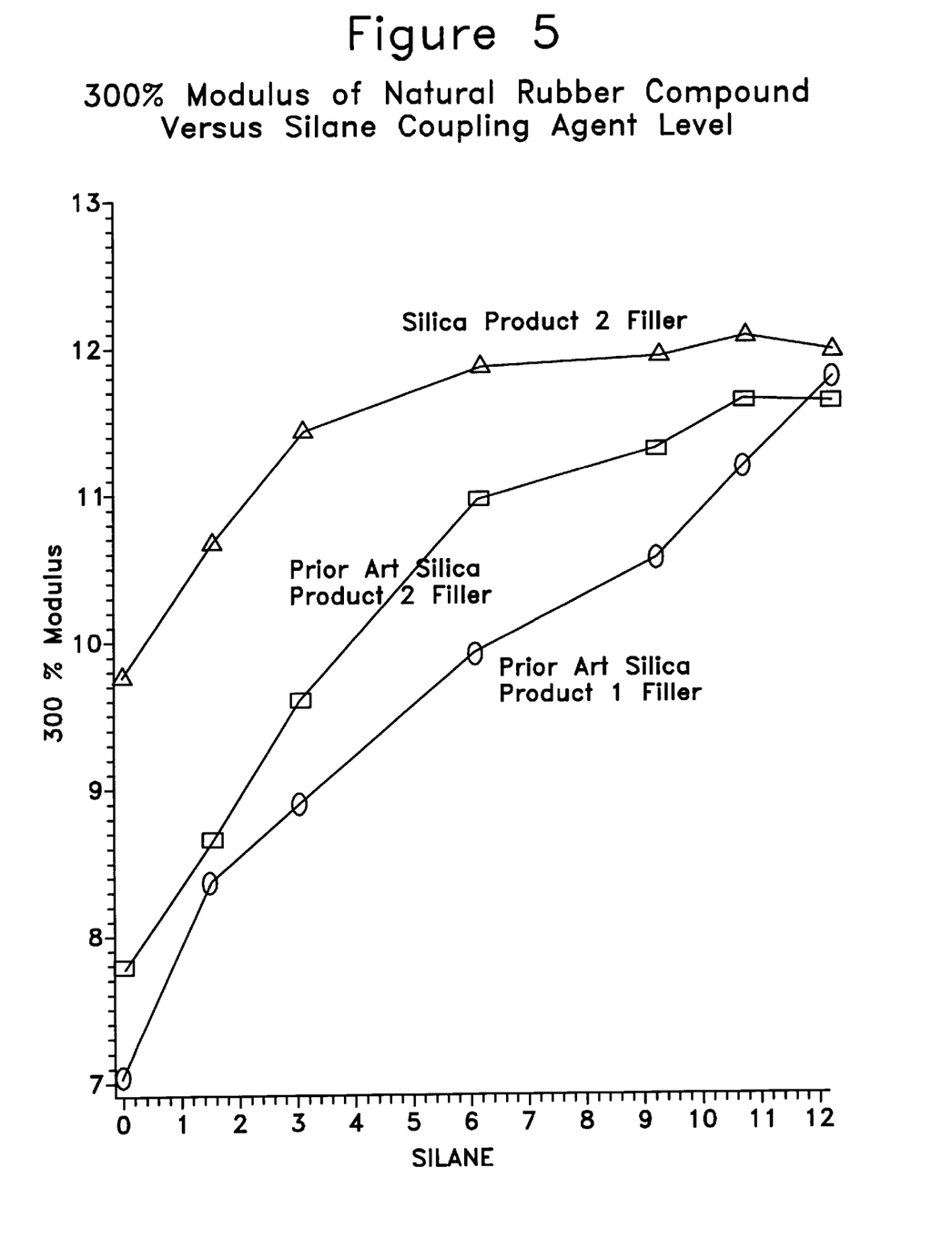
FIG. 5 is a graph of the relationship between 300% Modulus and silane content for a natural rubber compound containing various silica fillers.

Prepared were three natural rubber compounds containing one of three silica fillers at 60 phr: Prior Art Silica Products 1 and 2, and Silica Product 2. Several versions of each compound were prepared, the versions differing in the amount of silane coupling agent used. The coupling agent contents were varied between 0–12% (wt of coupling agent/ wt of silica) for each compound, and each version was evaluated for 300% Modulus in accordance with ASTM D1646. FIG. 5 is a plot of the 300% Modulus versus the silane coupling agent content for the three natural rubber compounds.

As revealed in FIG. 5, the 300% Modulus for the natural rubber compound in accordance with the invention is higher at all silane coupling agent contents. In addition, the 300% Modulus values for the inventive example reach a maximum at about 4–6% coupling agent, whereas neither of the two comparative silica-filled natural rubber compounds achieve the same high 300% Modulus even at 12% coupling agent. This example demonstrates that the invention provides better tread wear with less coupling agent than prior art silica-filled natural rubber compounds.

As shown in the examples, the invention is a highly workable natural rubber compound which provides better tread wear and lower rolling resistance than prior art natural rubber compounds. The invention furnishes these desirable characteristics with a much lower coupling agent demand than prior art natural rubber compounds containing silica fillers, thereby lowering production costs by reducing the need for expensive coupling agents.

While the invention has been described herein with reference to specific and preferred embodiments, it is understood that changes, modifications, substitutions and omissions may be made without departing from the spirit and scope of the invention defined in the appended claims.

We claim:

1. A natural rubber compound comprising a natural rubber and a precipitated amorphous silica filler, said silica filler having:

a CTAB specific surface area of about 10 $m^2/g$ to less than 140 $m^2/g$;

a multi-point BET surface area of about 50–225 m$^2$/g;

a 5% pH value of about 5.0–8.5;

a DBP oil absorption of about 160–310 cm$^3$/100 g;

a projected surface area of no greater than about 4000 nm$^2$; and a pore volume ratio of pores ranging from 175 to 275 Å in diameter to all pores less than 400 Å in diameter of about 10% to less than 50%.

2. The natural rubber compound according to claim 1, wherein said CTAB specific surface area of said silica filler is about 10–110 m$^2$/g.

3. The natural rubber compound according to claim 1, wherein said CTAB specific surface area of said silica filler is about 10 m$^2$/g to less than 100 m$^2$/g.

4. The natural rubber compound according to claim 1, wherein said projected surface area of said silica filler is no greater than about 3500 nm$^2$.

5. The natural rubber compound according to claim 1, wherein said silica filler is a formed silica product.

6. The natural rubber compound according to claim 5, wherein said formed silica product has a bulk density of about 0.16–0.30 g/mL.

7. The natural rubber compound according to claim 5, wherein said formed silica product has a bulk density of about 0.16–0.27 g/mL.

8. The natural rubber compound according to claim 1, wherein said silica filler is present in said natural rubber compound at about 40–80 phr.

9. The natural rubber compound according to claim 1, wherein said silica filler is present in said natural rubber compound at about 50–70 phr.

10. The natural rubber compound according to claim 1, further comprising a coupling agent.

11. The natural rubber compound according to claim 10, wherein said coupling agent is present in said natural rubber compound at about 2–10% of the weight content of said silica filler.

12. The natural rubber compound according to claim 10, wherein said coupling agent is present in said natural rubber compound at about 4–6% of the weight of said silica filler.

13. The natural rubber compound according to claim 1, further comprising a carbon black filler.

14. The natural rubber compound according to claim 13, wherein said silica filler and said carbon black filler each are present in said natural rubber composition at about 20–60 phr.

15. The natural rubber compound according to claim 10, further comprising a carbon black filler.

16. The natural rubber compound according to claim 15, wherein said silica filler and said carbon black filler each are present in said natural rubber composition at about 20–60 phr.

* * * * *

UNITED STATES PATENT AND TRADEMARK OFFICE
CERTIFICATE OF CORRECTION

PATENT NO. : 5,891,949
DATED : April 6, 1999
INVENTOR(S) : Evans, et. al.

It is certified that error appears in the above-identified patent and that said Letters Patent is hereby corrected as shown below:

Title page, item [57], Abstract, line 2, delete "filter", and insert --filler

Column 3, line 49, between "medium" and "total" insert -- ÷ --

Column 8, Table 2, 5th column under Heading N110 Carbon Black, Row 8, delete "0.21", and isert -- 0.121 --.

Signed and Sealed this

Twenty-fourth Day of August, 1999

Attest:

Q. TODD DICKINSON

*Attesting Officer*          *Acting Commissioner of Patents and Trademarks*